MAGNETIC AMPLIFIER AND FLIP-FLOP CIRCUIT EMBODYING THE SAME

Filed July 27, 1954 2 Sheets-Sheet 1

INVENTORS
JOHN PRESPER ECKERT, JR.
THEODORE H. BONN
ROBERT P. TALAMBIRAS

BY [signature]

ATTORNEY

MAGNETIC AMPLIFIER AND FLIP-FLOP CIRCUIT EMBODYING THE SAME

Filed July 27, 1954 2 Sheets-Sheet 2

Waveform Diagram Of Circuit Of Fig. 4

INVENTORS
JOHN PRESPER ECKERT, JR.
THEODORE H. BONN
ROBERT P. TALAMBIRAS .
BY
Sperry Light
ATTORNEY United States Patent Office 2,798,168

Patented July 2, 1957

2,798,168

MAGNETIC AMPLIFIER AND FLIP-FLOP CIRCUIT EMBODYING THE SAME

Theodore H. Bonn, John Presper Eckert, Jr., and Robert P. Talambiras, Philadelphia, Pa., assignors, by mesne assignments, to Sperry Rand Corporation, New York, N. Y., a corporation of Delaware Application July 27, 1954, Serial No. 446,095

20 Claims. (Cl. 307—88)

This invention relates to magnetic amplifiers and also to circuits such as flip-flop circuits utilizing the new type of amplifier herein disclosed.

The primary object of this invention is to provide a new and improved form of magnetic amplifier.

Another object of this invention is to provide a magnetic amplifier circuit in which the required number of semi-conductors is reduced.

Still another object of the present invention is to provide a magnetic amplifier which does not require a blocking voltage source.

A further object of the invention is to provide a magnetic amplifier of the carrier type in which the high frequency carrier currents are isolated from the input of the device and therefor do not load the same.

A still further object of the invention is to provide a magnetic amplifier of the carrier type in which only one magnetic core is required.

An additional object of the invention is to provide a magnetic amplifier circuit of the carrier type which requires only a single diode (or other rectifier).

Yet another object of the invention is to provide an improved magnetic amplifier in which the output is a pulsating current of such frequency that its potential may be increased or decreased by transformer action (or otherwise) and then filtered to give a smooth direct current amplitude of desired level.

Another object of the invention is to provide an improved bistable circuit or flip-flop circuit.

Still another object of the invention is to provide a bistable circuit which does not require a delay device as is the practice in the prior art.

A still further object of the invention is to provide a flip-flop circuit in which there is faster response, following predetermined input signals, than has been possible with prior art flip-flop circuits employing magnetic amplifiers.

Briefly speaking, one form of the invention employs a saturable core. High frequency spaced power pulses are fed through a first winding on the core and, in the absence of other magnetizing forces, the core is saturated by a succession of these pulses. The impedance of said winding is low when the core is substantially saturated. Other means, including an input, reset the core during the spaces between pulses depending upon whether or not input signals appear. If the core is not reset during the spaces between power pulses the core will be saturated, and (when a series amplifier is involved) there will be a large output. If the core is reset during the spaces between power pulses (in the case of the series amplifier) there will be iltle, if any, output.

The power pulses have a rather high frequency as compared to the maximum repetition rate of signal pulses. Therefore, the delay between the input signal and the output signal is small.

One feature of the invention is that a filter is located in the input circuit and presents high impedance to flow of current in the direction of the input. This prevents current flow (induced in the input circuit by the power winding) toward the input and it also prevents the input circuit from loading down the core. Such loading is troublesome when the core is in a high impedance condition since the impedance of the input circuit might limit the impedance which the core can reach and thus limit the extent of the non-linearity of the core or the amount of variation in the core impedance.

The invention is herein shown in conjunction with the series type of magnetic amplifier with the understanding that it is equally applicable to all types including the parallel, resonant and ferroresonant types of magnetic amplifiers.

Further details of the invention will be described in connection with the drawings, in which.

Figures 1, 2, 3:
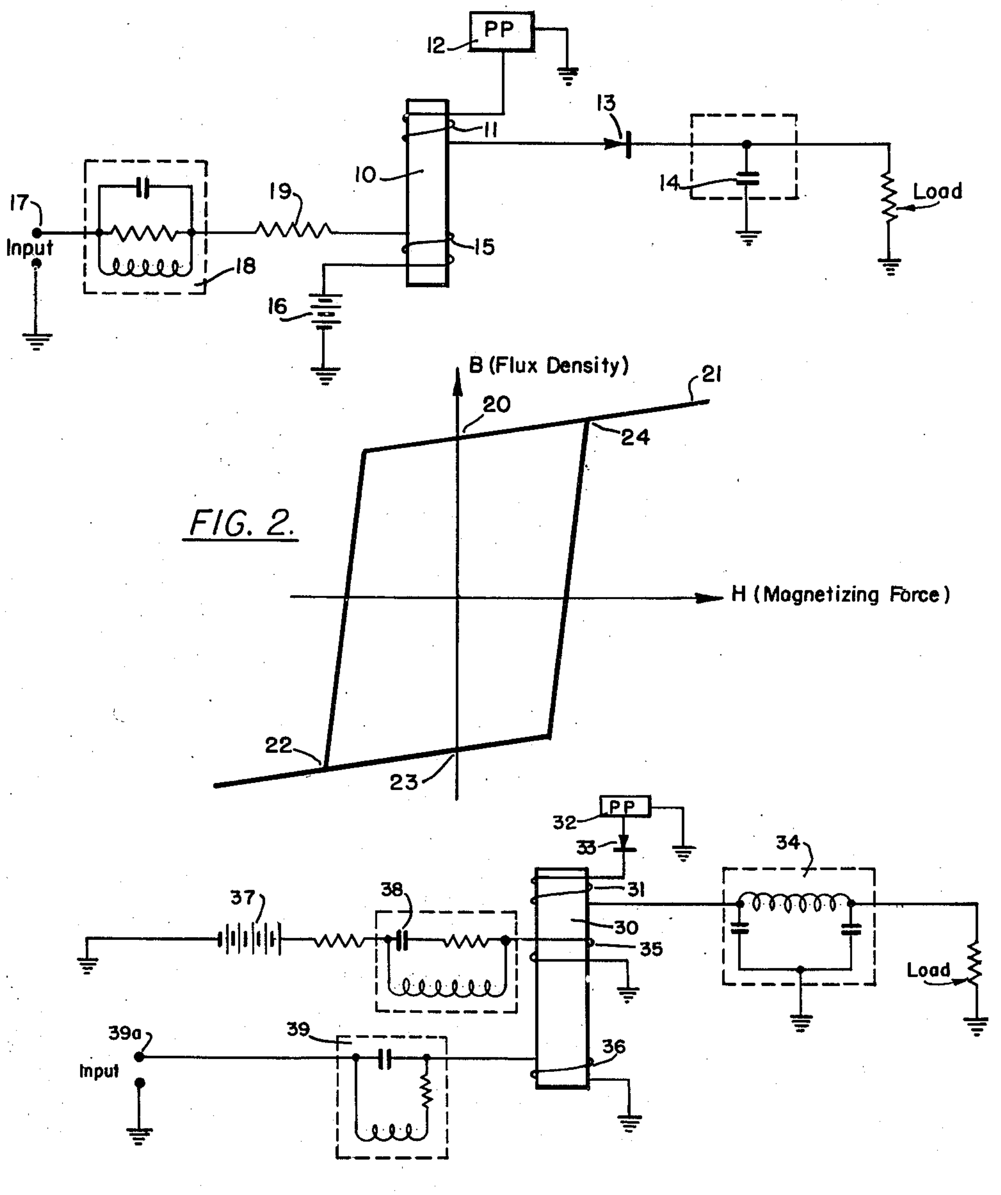
Figure 1 is a schematic diagram of one form of the invention.
Figure 2 is a hysteresis loop of the cores employed in connection with the invention.
Figure 3 is a schematic diagram of a modified form of the invention.

In all of the devices hereinafter disclosed, the magnetic core may be made of a variety of materials, among which are the various types of ferrites and the various magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in Figure 2). Cores of this character are now well known in the art. In addition to the wide variety of materials available, the core may be constructed in a number of geometries including both closed and open paths. For example, cup-shaped cores, strips, and toroidal-shaped cores are possible. Those skilled in the art understand that when the core is operating on the horizontal (or substantially saturated) portions of the hysteresis loop, the core is generally similar in operation to an airwave core, in that the coil on the core is of low impedance. On the other hand, when the core is operating on the vertical (or unsaturated) portions of the hysteresis loop, the impedance of the coil on the core will be high.

Figure 5:
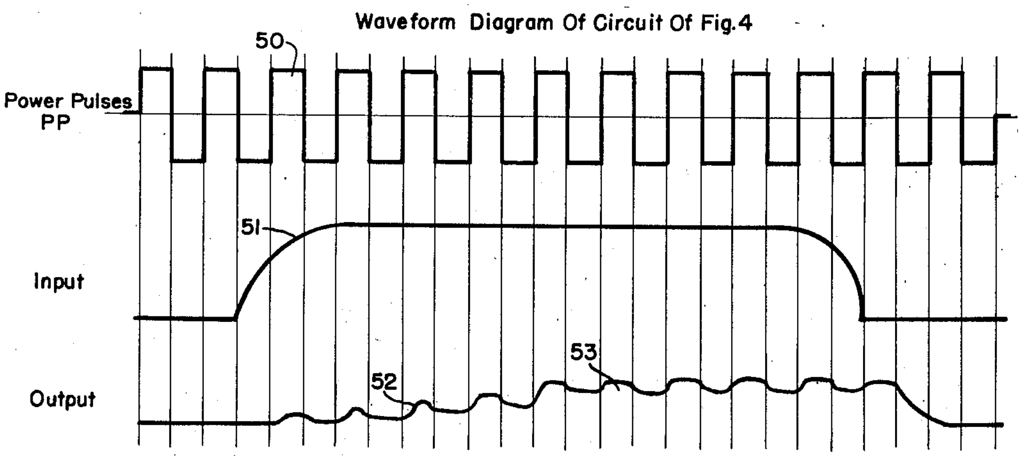
Figure 5 is a waveform diagram of the circuit of Figure 1.

In Figure 1, the magnetic core 10 has a power winding 11 fed with spaced power pulses from source 12. These power pulses flow through rectifier 13 to the load. Preferably, although not necessarily, the power pulses constitute a substantially square wave alternating potential, as shown in Figure 5. If it be assumed that no current is flowing in coil 15, and that the power pulses occur continuously, as shown in Figure 5, the core 10 will have positive magnetizing forces tending to drive it to saturation at point 21 of Figure 2. Between each pulse of the series, the core will return to point 20 of zero magnetizing force. Since the portion 20—21 of the hysteresis loop is a substantially saturated portion, the coil 11 will have low impedance as long as the core is operating on that portion of the curve.

During the spaces between pulses, the bias potential from battery 16 will flow through coil 15, resistor 19, filter 18, and input 17 to ground, thus establishing a negative magnetizing force in the core tending to drive the core from point 20 to point 22. When this happens, the next power pulse from source 12 through coil 11 will be unable to drive the core to saturation but will tend to drive it from point 23 to point 24, this being primarily an unsaturated portion of the hysteresis loop. Therefore, the core will have relatively high impedance to such a power pulse and very little current will flow through rectifier 13 to the load. If there is no signal at input 17, each power pulse from source 12 will tend to drive the core from point 23 to point 24. At the conclusion of the power pulse, the core will return to zero magnetizing value 20. Thereupon, the bias potential 16 will magnetize the core negatively, driving it from point 20 to point 22. During the next power pulse, the core will be driven back to point 24. As a result, the core will be merely driven around the hysteresis loop without substantial saturation at any time. The input signals on terminal 17 neutralize the bias current of battery 16. Therefore, when an input signal appears at terminal 17, no current flows in coil 15 and therefore the pulses flowing from source 12 through coil 11 repeatedly drive the core to saturation, thus giving a large output at the load.

As shown in Figure 5, the power pulses have high frequency as compared to the repetition rate of the signal pulses. There would be a tendency for the power pulses flowing through coil 11 to induce an alternating current in coil 15 at the frequency of the power pulses 50. In order to prevent this alternating current from flowing to the signal input 17, a filter 18 may be placed in series with the signal input. The filter 18 is tuned to reject all signals induced in coil 15 by virtue of the power pulses flowing through coil 11. In order to smooth out the current flowing to the load, a condenser 14 may be placed in parallel with the load.

It is also noted that, within limits, the potential at which the signal input 17 will actuate the device may be adjusted by varying the potential of battery 16. Moreover, it is noted that the aforesaid circuit eliminates one of the rectifiers normally employed in magnetic amplifiers. In addition, it is clear from the waveform diagram of Figure 5 that the response of the circuit is rapid. Moreover, the potential level of the output may be shifted to any of a wide variety of desired values by using any alternating current network or transformer in the output circuit prior to filtering.

Figure 3 is a modified form of the invention wherein the core 30 has a power winding 31 fed by power pulses from source 32 through rectifier 33. A filter 34 smooths out the current to the load. The aforesaid parts of Figure 3 operate in substantially the same way as parts 10 to 14 inclusive of Figure 1, and consequently a detailed explanation is unnecessary. Bias potential is furnished through coil 35 by battery 37. Filter 38 may be employed to prevent any alternating current induced in coil 35 from flowing to the battery 37. The filter 39 blocks flow of alternating current, which was induced in coil 36 from coil 31, from flowing to the input. The filter 39 may be designed to attenuate flow of alternating current to the input to any desired degree in accordance with well known principles. The bias battery 37 and the coil 35 of Figure 3 function in substantially the same way as the bias battery 16 and the coil 15 of Figure 1.

The main difference between Figure 1 and Figure 3 is that a separate coil 36 is employed in connection with Figure 3, in order to receive the input signals, whereas in Figure 1 the same coil 15 receives both the bias potential from battery 16 and the potential from the input 17.

In Figure 3, if there is no signal at the input, the current from battery 37 will flow through coil 35 driving the core negatively to point 22. The next power pulse through coil 31 will drive the core from point 23 to point 24 along the unsaturated portion thereof. At the conclusion of the power pulse, the core will return to zero magnetizing value at 20. During the space between power pulses, the battery 37 will again drive the core from point 20 to point 22. Hence, in the absence of an input, the source of bias 37 and the power pulses will alternately drive the core negatively and positively without substantial saturation. Hence, coil 31 will have high impedance and only a small current will flow to the load. If a signal is received at the input, it will flow through coil 36 and neutralize the effect of the bias source 37. Hence, successive power pulses from source 32 will repeatedly magnetize the core from point 20 to saturation point 21. During this interval the coil 31 will have low impedance since the core is saturated and the power pulses will readily flow therethrough to the load giving a large output.

In all forms of the invention, it is desirable to properly proportion the number of turns on the windings and the magnitudes of the several currents in the device. For example, the power pulses should be of such amplitude as to normally drive the core from point 23 to point 24. If the amplitude of these power pulses is too low, the core might not be driven sufficiently close to point 24 and a different mode of operation than as before described would ensue. On the other hand, the power pulses should not be of such large magnitude as to drive the core from point 23 clear to saturation at point 21, as that would give an output at the load at a time when no output is desired. Similarly, the bias source should be so related to its complementary winding that during the space between power pulses the core is driven from point 20 to point 22. If the bias voltage is too low the core might return to point 20 at the start of the next power pulse, wherefore the next power pulse would drive the core to point 21. On the other hand, the source of bias potential preferably should not be so large as to drive the core from point 20 to saturation in the negative direction. The input signal should preferably be of such magnitude as to substantially neutralize the source of bias. Even though there are practical limits to the relative values of the parts, it is still possible to effect substantial adjustments. For example, the potential required at the input in order to operate the device may be varied within limits by varying the potential of battery 16. If further variations in the potential required, at terminal 17, in order to operate the device, are desired, this too can be accomplished if both the coil 15 and the battery 16 are altered to meet the new condition.

Figure 4:
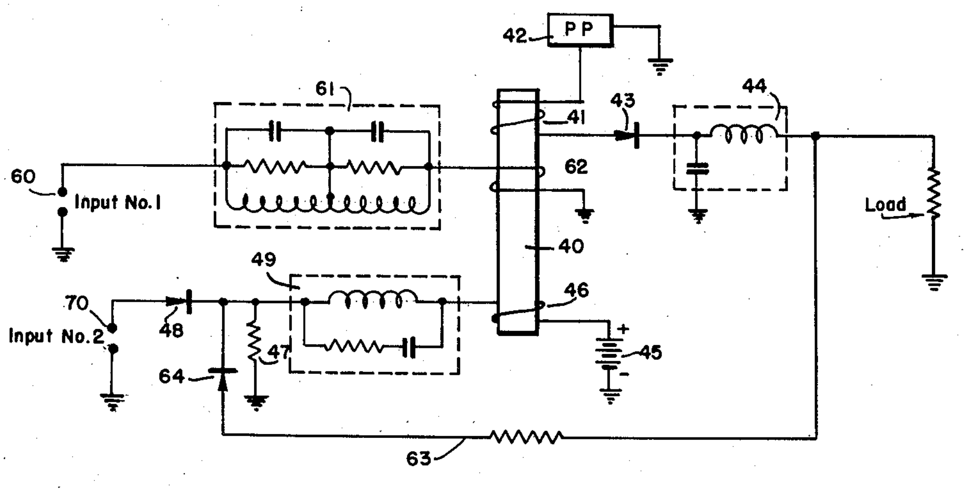
Figure 4 is a schematic diagram of a flip-flop circuit embodying the new type of magnetic amplifier herein described.

Figure 4 illustrates a bistable device (also known as a flip-flop circuit) embodying the new principle. The core 40 has power winding 41 fed by power pulses from source 42. These power pulses flow through rectifier 43 and filter 44 to the load. These parts function in substantially the same way as the complementary parts of Figures 1 and 3. Bias battery 45 tends to supply current through coil 46, resistor 47 to ground. This bias tends to apply a magnetizing force in the negative direction to the core during the spaces between power pulses. A signal fed to input 70 will flow through rectifier 48, filter 49, to coil 46 and will tend to neutralize the effect of the battery 45. A second input 60 is provided which feeds current through filter 61 and coil 62.

The circuit has two stable states, the first of which states is as follows: Successive power pulses from source 42 drive the core to saturation and a large current appears at the load. The second of the stable states is that each power pulse from source 42 tends to drive the core along the unsaturated portion 23—24 of the hysteresis loop and during the spaces between pulses the bias battery 45 tends to drive the core from point 20 to point 22. In this stable state the core operates primarily on unsaturated portions of the hysteresis loop, wherefore coil 41 has high impedance and very little current appears at the load.

Assume that at the start of the apparatus, there are no signals on either of inputs 60 and 70, and that the device is in its second stable state. The first power pulse from source 42 would tend to drive the core from point 23 to point 24. In the space following this power pulse, the bias battery 45 would send a current through coil 46 tending to drive the core from point 20 to point 22. The next power pulse would again drive the core from point 23 to point 24, and during the space following that power pulse the core would again be driven from point 20 to point 22 by the bias battery 45. Hence, the core would be continuously driven around the hysteresis loop without substantially saturation. Coil 41 would therefore have high impedance and very little current would flow to the load. If a signal appears at input terminal 70 and neutralizes the effect of the bias battery 45, there will be no flux tending to drive the core negatively and successive power pulses from source 42 would drive the core from point 20 to point 21, repeatedly. Since then the core would be operating on substantially saturated portions of the hysteresis loop, the power pulses would flow freely from source 42 to the load giving a large output. Due to the filter 44, the signal at the load would be a substantially continuous direct current and would be transmitted through feedback circuit 63 and rectifier 64 to the input 70, thus continuing to neutralize the effect of bias battery 45. Consequently, the only magnetizing forces on the core would continue to be those due to the power pulses flowing through coil 41 and the core would continue to be driven along the saturated portions thereof. If now a signal appears at input 60, it will establish a current in coil 62 which will tend to apply negative magnetizing forces to the core and will therefore drive the core from point 20 to point 22 during the spaces between power pulses. Hence, the next power pulse will drive the core along the unsaturated portion 23 to 24, wherefore the coil 41 assumes high impedance and very little current flows to the load. Hence, the current in the feedback circuit 63 is stopped and bias battery 45 then becomes effective to apply a negative magnetizing force to the core. Thereupon the device assumes the stable state in which its operations are primarily along unsaturated portions of the hysteresis loop with very little output at the load. If then, the device continues to operate in this stable state for a long time period and then at a later time another signal appears on input 70, the effect of battery 45 will again be neutralized and the device will flip to the first-named stable state in which coil 41 has low impedance and a large current flows to the load. It is understood that in connection with Figure 4, the power pulses 50 have high frequency as compared to the input signals 51, as is shown in Figure 5, and as described in connection with Figure 1.

The filters 18, 38, 49 and 61 may be of any suitable type that will prevent currents induced in coils 15, 35, 46 and 62, due to the flow of power pulses in coils 11, 31 and 41, from passing to input terminals 17, 39*a*, 70 and 60. Various networks of condensers, inductors and resistors for accomplishing this blocking function are well known. The effectiveness of the filter is a matter of design which may be varied to a greater or lesser degree depending on how much it is necessary to attenuate the high frequency currents before they reach the inputs. Likewise, the filters 14, 34 and 44 may be of any suitable type.

The filters in the input circuits are not only designed to block flow of power pulses toward the input but to present high impedance to the flow of currents at the frequency of the power pulses. This means that windings 15, 36 and 46 are not short-circuited by the filter or the input, at the frequency of the power pulses.

Whether or not an input filter is tuned to the correct frequency is determined by whether or not it presents high impedance to the unwanted currents when the filter is connected in the circuit. There are situations, within the scope of our invention, although not specifically described herein, where a filter per se considered and tested apart from the remainder of the circuit, has a different resonant frequency than when connected in the circuit.

Figure 6:
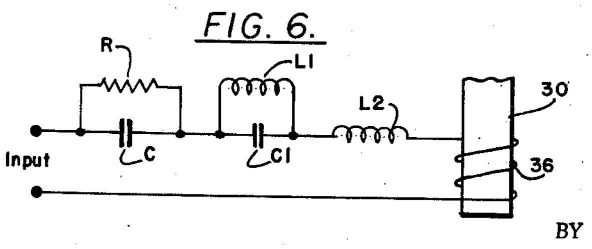
Figure 6 is a circuit showing an improved input arrangement.

A preferred filter and input circuit is shown in Figure 6. In this circuit, assume that $L_1 \approx 2L_2$; that $L_1$ and $C_1$ are tuned to resonate at the carrier frequency $f_c$; and that R is the forcing resistor and is chosen to give a desired rise time. C is then chosen so that:

$$C \approx \frac{4.2(L_1+L_2)}{R^2}$$

The Q of the $L_1C_1$ combination should be greater than five at the carrier frequency $f_c$. Z is the flipping impedance of the core at the carrier frequency referred to the input winding and is defined as the ratio of the voltage required to take the core from point 23 to point 24 (Figure 2) in a half carrier cycle to the average current during the flipping time. Then:

$$2\pi f_c L_2 = \frac{Z}{12.5}$$

C is chosen to give about 5% overshoot in the output pulse. C may be increased over the value given with a resultant slight decrease in rise time and an increase in the overshoot. C may also be decreased and in the limit of zero capacitance the rise time will be about 1.7 times the rise time obtained with the value of C given above.

The ratio of $L_1/L_2$ can be increased to approximately 3 or reduced to ½ before the power gain to rise time ratio is halved. $L_2$ may be doubled or taken to 75% of the value indicated in the equation before the power gain to rise time ratio is halved.

We claim to have invented:

1. In a magnetic amplifier, a single core, a first winding on said core, a load, a source of power pulses feeding said load through said winding, and means conditioning the core to determine whether said winding will present high or low impedance to the flow of said power pulses comprising a D. C. bias source, a second winding on the said core connected to said bias source and tending to apply a magnetizing force to the core in opposite sense to the magnetizing forces of the said power pulses, and input means including a third winding on the said core for selectively producing an additional magnetizing force on said core for selectively changing the resultant magnetizing force on said core, the maximum repetition rate of pulses at the input means being small as compared to the repetition rate of the power pulses and the input signal pulses having such long duration that a plurality of power pulses occur during the existence of one signal input pulse.

2. In a magnetic amplifier, a core, a first winding on the core, a source of power pulses feeding said winding, a load connected to receive the power pulses that pass through said winding, a second winding on the core, and input means for energizing the second winding with intermittent signal pulses the durations of which are so long that a plurality of power pulses occur during each signal pulse, a third winding on the core, bias means connected to the third winding and tending to reset the core between power pulses, and filter means between said input means and said second winding to present high impedance to the flow of current at the repetition rate of said source toward the input means.

3. A magnetic amplifier as defined in claim 2 in which the filter means comprises the following in series, an inductor, a parallel resonant circuit tuned to the repetition rate of the power pulses, and a parallel RC circuit.

4. In a magnetic amplifier, a first source of control signals characterized by a series of selective signal pulses, a second source emitting an uninterrupted train of spaced unidirectional power pulses of high repetition rate and short duration as compared with the signal pulses, a core of magnetic material having a substantially rectangular hysteresis loop, means for applying magnetizing forces to the said core in accordance with both the power pulses and the signal pulses in such a way that the power pulses are controlled depending on the presence or absence of said signal pulses, said last named means comprising first and second windings on said core coupled respectively to said first and second sources, a filter connected between the said first source and said first winding, which filter blocks currents at the frequency of said power pulses, and a D. C. bias source coupled to said core for applying a magnetizing force thereto in opposition to the magnetizing force of said power pulses.

5. In an electrical circuit of the class described, a core of magnetic material characterized by a substantially rectangular hysteresis loop, a winding on said core, a source of power pulses in series with said winding, said power pulses having sufficient amplitude to drive the core to saturation when they occur repeatedly without other magnetizing forces being applied to the core, a D. C. bias source for normally applying a magnetizing force to the said core in a sense opposite to the magnetizing forces effected by said power pulses thereby to so drive the core that the said power pulses cannot effect saturation, means responsive to an input pulse for selectively neutralizing the magnetizing force of said D. C. bias whereby said power pulses drive said core to saturation in response to an input pulse, the frequency of the said power pulses being high as compared to the maximum input pulse frequency and the duration of an input pulse extending over a time period covered by a plurality of power pulses, and a filter coupled to said last named means and tuned to block currents at the frequency of said power pulses.

6. In a circuit of the class described, a core of magnetic material exhibiting a substantially rectangular hysteresis loop, a power winding on the core, a load in series with said winding, a source of spaced power pulses in series with the load and said winding, said power pulses having sufficient amplitude and duration that in the absence of other magnetizing forces a succession of said pulses will drive the core to saturation in a first direction, D. C. bias means coupled to a further winding on said core for normally applying a magnetizing force to said core during the spaces between power pulses thereby to drive the core in a direction opposite to said first direction to such an extent that the next power pulse cannot drive the core to saturation, a source of signal pulses of low frequency and long durations as compared to the frequency and durations respectively of the said power pulses, a still further winding on said core fed by said signal pulses for selectively producing a preselected resultant magnetizing force in said core, and a filter between the said source of signal pulses and said still further winding to prevent current at the frequency of said power pulses from flowing to the signal source.

7. In an electrical circuit of the class described, a core characterized by a substantially rectangular hysteresis loop, a power winding on the core, a source of spaced power pulses in series with said winding, output means connected to said source and said winding, said power pulses having such amplitude and duration that a succession of them will drive the core to saturation in one direction but one pulse is insufficient to effect saturation if the core is far removed from saturation when said pulse occurs, a second winding on the core, a source of D. C. bias for feeding said second winding to drive said core in a direction opposite the first one so that the next power pulse will not saturate the core, signal input means coupled to said second winding for producing control pulses that cancel the effect of the bias means, the power pulses having substantially higher frequency than the maximum frequency of the control pulses, and filter means for blocking flow of energy at said higher frequency to the signal input means.

8. The apparatus of claim 7 in which the signal input means also includes a third winding on the core, and means for selectively applying further control pulses to said third winding.

9. A magnetic amplifier as defined in claim 8 having means for smoothing the pulses that pass to the load.

10. In an electrical circuit of the class described, a core characterized by a substantially rectangular hysteresis loop, a first winding on the core, a source of spaced power pulses for energizing said winding, said pulses having such magnitude and duration that a succession of them will tend to drive the core to saturation, and means whereby the circuit assumes one of two stable states, one of the stable states being characterized by said power pulses repeatedly driving the core to saturation, the other stable state being characterized by the power pulses respectively driving the core along unsaturated portions of said hysteresis loop, said last-named means comprising a second winding on the said core, bias means for applying a current to the said second winding tending to apply a magnetizing force to the core in opposition to the magnetizing force of said power pulses thereby to prevent the said power pulses from saturating the core, first input means for selectively energizing said second winding thereby selectively to neutralize the magnetization effect of said bias means whereby said power pulses drive said core to saturation, feedback means between said first and second windings for energizing said second winding subsequent to cessation of a signal from said first input means whereby said power pulses continue to drive said core to saturation, and second input means for selectively applying a magnetization force to said core in opposition to said power pulses whereby said circuit is selectively reverted to its said other stable state after operation of said first input means, the repetition rate of said power pulses being high as compared to the frequency of energization of signals from said first and second input means.

11. The apparatus of claim 10 including two filters respectively in series with said first and second input means for blocking flow of energy at the frequency of the power pulses to said inputs.

12. Apparatus of the class described comprising a core characterized by a substantially rectangular hysteresis loop, winding means on the core, a source of spaced power pulses connected in series with at least a part of said winding means whereby a magnetizing force is applied to the core in a first direction due to the power pulses, first and second inputs that respectively energize the winding means to create magnetizing forces in first and second directions respectively, and feedback means for feeding energy of said power pulses that has traversed at least a part of the winding means to the first of said inputs whereby when the first input is energized the feedback means will tend to hold the apparatus in a stable state until the second input is energized, the time duration of the pulses at the inputs being so long as to include a plurality of power pulses and the feedback means including storage means for storing energy received from the power pulses and discharging it during the spaces between pulses.

13. In apparatus of the class described, a core characterized by a substantially rectangular hysteresis loop, a first winding on the core, a source of spaced power pulses in series with said first winding, a second winding on the core, a first input, a first filter tuned to block flow of current induced in the second winding by said power pulses, said filter connecting the first input to the second winding, a third winding on the core, bias means connected to pass current through the third winding, a second input, a second filter tuned to block flow of current induced in the third winding by power pulses, said second filter connecting the second input to the third winding, the power pulses and the second input having such polarities that the magnetizing forces produced thereby tend to establish magnetizing forces in the core in a first direction, the first input and the bias means having such polarities that the magnetizing forces produced thereby tend to establish magnetizing forces in the core in a second direction which is opposite the first one, and feedback means for feeding at least a portion of the power pulses that have traversed the first winding to the second input.

14. Apparatus as set forth in claim 13 in which the power pulses have such limited amplitude and duration that a single pulse cannot drive the core to saturation unless said core was near saturation at the start of said pulse, the said inputs and bias means having potentials of such magnitudes that when the first input is energized the core is, during the spaces between power pulses, repeatedly driven in one direction without core saturation being effected and during the power pulses said core is repeatedly driven in the other direction without core saturation being effected, said second input being adapted to neutralize said bias means thereby to enable said power pulses to repeatedly drive the core to saturation, said feedback means being adapted to transfer at least a portion of the energy passing through the first winding to the said second input thereby to continue neutralization of the said bias means.

15. Apparatus is defined in claim 14 in which the durations of the power pulses are short as compared to duration of pulses at the inputs whereby a plurality of power pulses occur during the existence of any one input pulse, the feedback means including a filter for smoothing the feedback currents whereby the latter are substantially direct current as they are applied to the second input.

16. Apparatus of the class described comprising a core characterized by a substantially rectangular hysteresis loop, a plurality of windings on the said core, a first source of spaced power pulses for feeding current through a first winding of said plurality, output means connected to receive said current, bias means connected to a second winding of said plurality for normally applying magnetizing forces to the core during the spaces between power pulses in the opposite direction to the magnetizing forces set up by the said power pulses, said power pulses and bias means having such amplitudes that during the spaces between pulses the bias means will drive the core so far in one direction that the next power pulse cannot saturate the core when it drives the core in the other direction, input means including a second source of spaced input pulses coupled to one of said plurality of windings on said core, the said input pulses having such polarity as to oppose the magnetizing effect of the said bias means whereby during the presence of an input pulse the power pulses will repeatedly drive the core to saturation, the duration of the input pulses being so long that a plurality of power pulses occur between the beginning and end of each input pulse, and a filter which blocks current at the frequency of the power pulses connected between said second source and said winding means whereby currents at the frequency of the power pulses will not flow through said second source.

17. In a control circuit, a magnetic amplifier comprising a core of magnetic material having first and second windings thereon, a source of unidirectional power pulses coupled to one end of said first winding tending to drive said core into saturation in a predetermined orientation, a load coupled to the other end of said first winding, a D. C. bias supply coupled to said second winding for normally producing a magnetomotive force in opposition to said power pulses whereby said core normally remains unsaturated, and signal input means for selectively nullifying the magnetomotive force of said D. C. bias supply thereby to permit said power pulses to drive said core into saturation whereby outputs appear at said load.

18. The circuit of claim 17 wherein said signal input means comprises a signal source coupled to said second winding.

19. The circuit of claim 18 including feedback means between said other end of said first winding and one end of said second winding whereby said circuit exhibits bistability.

20. The circuit of claim 19 including a third winding on said core, and means selectively coupling control signals to said third winding for producing a further magnetizing force on said core in opposition to said power pulses.

References Cited in the file of this patent

UNITED STATES PATENTS

| | | |
|---|---|---|
| 2,108,642 | Boardman | Feb. 15, 1938 |
| 2,164,383 | Burton | July 4, 1939 |
| 2,640,164 | Giel et al. | May 26, 1953 |
| 2,685,653 | Orr et al. | Aug. 3, 1954 |
| 2,695,993 | Haynes | Nov. 30, 1954 |